United States Patent
Partridge et al.

(10) Patent No.: US 8,257,583 B2
(45) Date of Patent: Sep. 4, 2012

(54) VEHICLE MOUNTED FUEL SEPARATION APPARATUS

(75) Inventors: Randall D. Partridge, Califon, NJ (US); Kouseki Sugiyama, Numazu (JP)

(73) Assignees: ExxonMobil Research and Engineering Company, Annandale, NJ (US); Toyota Jidosha Kabushiki Kaisha, Toyota (JP)

( * ) Notice: Subject to any disclaimer, the term of this patent is extended or adjusted under 35 U.S.C. 154(b) by 824 days.

(21) Appl. No.: 12/318,134

(22) Filed: Dec. 22, 2008

(65) Prior Publication Data

US 2010/0155322 A1 Jun. 24, 2010

(51) Int. Cl.
*B01D 35/18* (2006.01)

(52) U.S. Cl. ........ 210/149; 210/181; 210/321.6; 123/524

(58) Field of Classification Search .......... 210/86, 210/321.6, 500.27, 200.39, 605, 634, 640, 210/649, 651, 652, 653, 654, 655; 261/18.3, 261/34.1, 34; 123/1 A, 3, 34.1, 179.8, 179.9, 123/575–578
See application file for complete search history.

(56) References Cited

U.S. PATENT DOCUMENTS

| | | | | |
|---|---|---|---|---|
| 4,031,864 A * | 6/1977 | Crothers | | 123/1 A |
| 6,332,448 B1 | 12/2001 | Ilyama et al. | | |
| 6,711,893 B2 * | 3/2004 | Ueda et al. | | 60/285 |
| 6,972,093 B2 * | 12/2005 | Partridge et al. | | 210/321.6 |
| 7,013,844 B2 * | 3/2006 | Oda | | 123/3 |
| 7,665,428 B2 * | 2/2010 | Dearth et al. | | 123/1 A |
| 7,802,562 B2 * | 9/2010 | Lippa et al. | | 123/577 |
| 7,803,275 B2 * | 9/2010 | Partridge et al. | | 210/640 |
| 7,981,278 B2 * | 7/2011 | Kamio et al. | | 210/86 |
| 2002/0139321 A1 * | 10/2002 | Weissman et al. | | 123/1 A |
| 2004/0144723 A1 * | 7/2004 | Gloeckle et al. | | 210/640 |
| 2004/0149644 A1 * | 8/2004 | Partridge et al. | | 210/321.6 |
| 2005/0103285 A1 * | 5/2005 | Oda | | 123/3 |
| 2006/0021603 A1 * | 2/2006 | Nagata | | 123/514 |
| 2010/0024772 A1 * | 2/2010 | Lewis et al. | | 123/446 |

FOREIGN PATENT DOCUMENTS

| | | |
|---|---|---|
| JP | A-2001-50070 | 2/2001 |
| JP | A-2004-232624 | 8/2004 |
| JP | A-2007-231818 | 9/2007 |

\* cited by examiner

*Primary Examiner* — Duane Smith
*Assistant Examiner* — Thomas McKenzie
(74) *Attorney, Agent, or Firm* — Oliff & Berridge, PLC

(57) ABSTRACT

A fuel separation apparatus comprises a stock fuel storage tank storing stock fuel, a separator provided with a separation film separating the stock fuel into high octane value fuel with an octane value higher than the stock fuel and a low octane value fuel with an octane value lower than the stock fuel, and a high octane value fuel storage tank storing the high octane value fuel separated by the separator. When the temperature of the separation film is lower than the high octane value fuel separation temperature, the high octane value fuel stored in the high octane value fuel storage tank is supplied to the separator. Due to this, vaporization of fuel is suppressed and the fuel can be quickly raised in temperature. Due to this, a vehicle mounted fuel separation apparatus able to quickly raise the temperature of the fuel supplied to the separation film so as to quickly raise the temperature of the separation film at the time of engine cold start can be provided.

9 Claims, 8 Drawing Sheets

VEHICLE MOUNTED FUEL SEPARATION APPARATUS

TECHNICAL FIELD

The present invention relates to a vehicle mounted fuel separation apparatus.

BACKGROUND ART

Known in the art is a fuel separation apparatus which separates fuel supplied as a stock material (that is, stock fuel) to produce fuels of different properties from the stock fuel. As such a fuel separation apparatus, for example, there is one provided with a fractional distiller for fractional distillation of the stock fuel into a high octane value fuel with an octane value higher than the stock fuel and a low octane value fuel with an octane value lower than it (for example, Japanese Patent Publication (A) No. 2007-231818).

In particular, in the fuel separation apparatus described in Japanese Patent Publication (A) No. 2007-231818, a temperature regulator is provided in proximity to the fractional distiller. This temperature regulator is used to change the temperature of the fuel in the fractional distiller so as to fractionally distill the stock fuel. Further, in the fuel separation apparatus, at the time of engine cold start, the fractional distiller is not in a temperature environment suitable for fractional distillation. Therefore, the fractional distillation operation by the fractional distiller is stopped until the temperature environment around the fractional distiller reaches a temperature environment suitable for fractional distillation.

In this regard, as a fuel separation apparatus, one provided with a separation film selectively allowing the permeation of the high octane value components in the fuel has been proposed. In this fuel separation apparatus, high octane value fuel with an octane value higher than the stock fuel is produced at one side of the separation film, while low octane value fuel with an octane value lower than the stock fuel is produced at the other side of the separation film.

To optimally separate the stock fuel by this separation film, it is necessary that the separation film be a certain extent of temperature. Therefore, at the time of engine cold start, the temperature of the separation film has to be quickly raised. In particular, when the separation film is raised in temperature by the stock fuel supplied to the separation film, the temperature of the stock fuel supplied to the separation film has to be quickly raised.

DISCLOSURE OF INVENTION

Therefore, an object of the present invention is to provide a vehicle mounted fuel separation apparatus able to quickly raise the fuel supplied to the separation film so as to quickly raise the temperature of the separation film at the time of engine cold start.

To achieve this object, in one aspect of the present invention, there is provided a vehicle mounted fuel separation apparatus, provided with a stock fuel storage tank storing stock fuel, a separator provided with a separation film separating the stock fuel into a high octane value fuel with an octane value higher than the stock fuel and a low octane value fuel with an octane value lower than the stock fuel, and a high octane value fuel storage tank storing the high octane value fuel separated by the separator, wherein the high octane value fuel stored in the high octane value fuel storage tank is supplied to the separator when the temperature of the separation film is lower than the high octane value fuel separation temperature.

The separation film is raised in temperature for example by heating the fuel flowing into the separator and transmitting the heat from the fuel to the separation film. In this regard, if heating the stock fuel, the stock fuel ends up vaporizing. Due to the heat of vaporization, the stock fuel is not sufficiently raised in temperature. As a result, the separation film cannot be quickly raised in temperature. As opposed to this, in this aspect, when the temperature of the separation film is low, high octane value fuel flows into the separator. High octane value fuel is more difficult to vaporize than stock fuel. Therefore, the high octane value fuel is quickly raised in temperature.

In another aspect of the present invention, when the temperature of the separation film becomes the high octane value fuel separation temperature or more, the stock fuel stored in the stock fuel storage tank is supplied to the separator.

In another aspect of the present invention, the apparatus is further provided with a three-way valve connected to the stock fuel storage tank, separator, and high octane value fuel storage tank, and the three-way valve connects the high octane value fuel storage tank to the separator when the temperature of the separation film is lower than the high octane value fuel separation temperature and connects the stock fuel storage tank to the separator when the temperature of the separation film is the high octane value fuel separation temperature or more.

In another aspect of the present invention, the apparatus is further provided with a fuel heating device heating the fuel, and the fuel flowing into the separator is heated by the fuel heating device before flowing into the separator.

In another aspect of the present invention, the apparatus is further provided with a jet pump generating negative pressure by the flow of fuel, the separator is divided into two chambers by the separation film, and one chamber among these chambers is reduced in pressure by the negative pressure generated by the jet pump.

In another aspect of the present invention, the apparatus is provided with a return passage extending from a passage for supplying fuel from the high octane value fuel storage tank to a fuel injector and returning part of the fuel heading from the high octane value fuel storage tank to the fuel injector, to the high octane value fuel storage tank, and the jet pump is attached to the return passage and generates negative pressure by the flow of high octane value fuel through the return passage.

In another aspect of the present invention, the pressure of the high octane value fuel supplied to the separator when the temperature of the separation film is lower than the high octane value fuel separation temperature is made higher than the pressure of the stock fuel supplied to the separator when the temperature of the separation film is the high octane value fuel separation temperature or more.

In still another aspect of the present invention, there is provided a vehicle mounted fuel separation apparatus provided with a stock fuel storage tank storing stock fuel, a separator provided with a separation film separating the stock fuel into a high octane value fuel with an octane value higher than the stock fuel and a low octane value fuel with an octane value lower than the stock fuel, and a high octane value fuel storage tank storing the high octane value fuel separated by the separator, wherein the pressure of the fuel supplied to the separator when the temperature of the separation film is lower than the high octane value fuel separation temperature is made higher than the pressure of the fuel supplied to the separator when the temperature of the separation film is the high octane value fuel separation temperature or more.

In this aspect, when the temperature of the separation film is low, the pressure of the fuel supplied to the separator is raised. When the pressure of the fuel is high, the fuel becomes harder to vaporize. For this reason, the fuel can be quickly raised in temperature.

In another aspect of the present invention, the apparatus is further provided with a regulator controlling the pressure of the fuel flowing into the separator and the working pressure of the regulator is changed to change the pressure of the fuel supplied to the separator.

According to the present invention, it is possible to quickly raise the temperature of the fuel supplied to the separation film and thereby possible to quickly raise the temperature of the separation film, at the time of engine cold start.

BRIEF DESCRIPTION OF THE DRAWINGS

The present invention will be more clearly understood from the description as set forth below with reference to the accompanying drawings, in which.

BEST MODE FOR CARRYING OUT THE INVENTION

Figure 1:
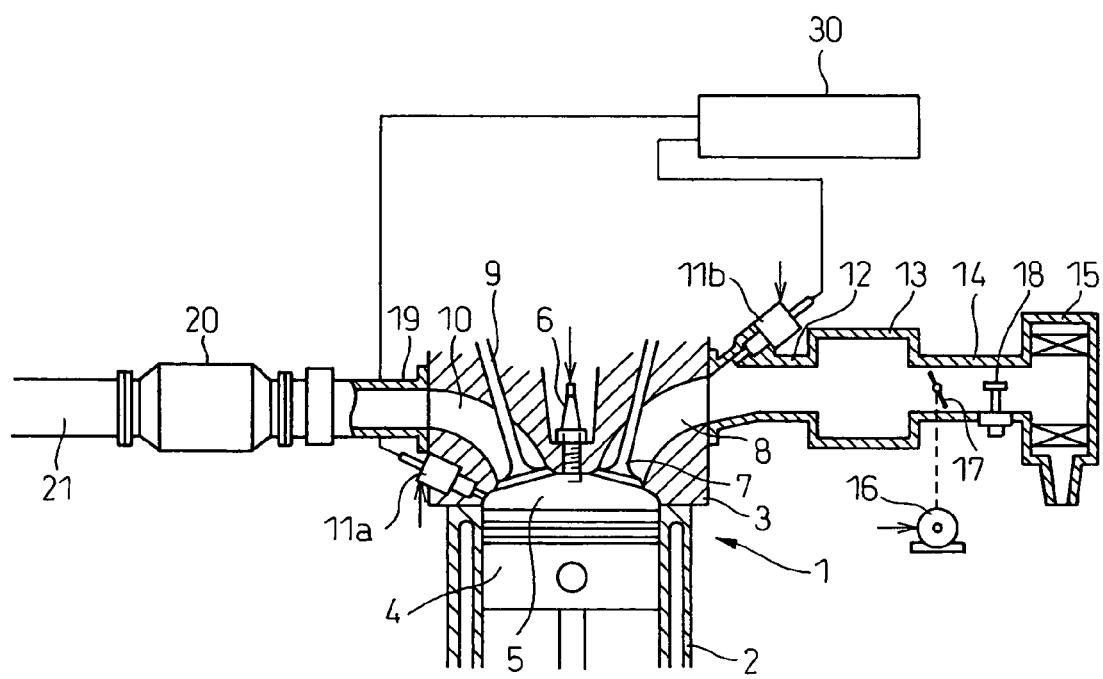
FIG. 1 is a side cross-sectional view of a spark ignition type internal combustion engine on which a fuel separation apparatus is mounted.

Below, embodiments of the present invention will be explained in detail with reference to the drawings. Note that, in the following explanation, similar component elements are assigned the same reference numerals. FIG. 1 is a side cross-sectional view of a spark ignition type internal combustion engine on which a fuel separation apparatus is mounted.

Referring to FIG. 1, 1 is an engine body, 2 is a cylinder block, 3 is a cylinder head, 4 is a piston, 5 is a combustion chamber, 6 is a spark plug arranged at the center of the top surface of the combustion chamber 5, 7 is an intake valve, 8 is an intake port, 9 is an exhaust valve, and 10 is an exhaust port. At the peripheral part of the inside wall of the cylinder head 3, a fuel injector (hereinafter, referred to as "in-cylinder fuel injector") 11a directly injecting fuel into the combustion chamber 5 is arranged. Each such intake port 8 is connected through an intake branch tube 12 to a surge tank 13. At each intake branch tube 12, a fuel injector (hereinafter, referred to as a "port fuel injector") 11b for injecting fuel toward the corresponding intake port 8 is arranged. These fuel injectors 11a, 11b are connected to a fuel separation apparatus 30.

The surge tank 13 is connected through an intake duct 14 to an air cleaner 15. Inside the intake duct 14, a throttle valve 17 driven by an actuator 16 and an air flow meter 18 are arranged. On the other hand, an exhaust port 10 is connected to a catalyst converter 20 housing an exhaust purification catalyst (for example, a three-way catalyst) through an exhaust manifold 19. The catalyst converter 20 is connected to an exhaust pipe 21.

Next, a vehicle mounted fuel separation apparatus 30 in the present embodiment will be explained. The fuel separation apparatus 30 separates the stock fuel (for example, ordinary (commercially available) gasoline) stored in the stock fuel storage tank into high octane value fuel with an octane value higher than the stock fuel and low octane value fuel with an octane value lower than the stock fuel and supplies the high octane value fuel to the port fuel injector 11b and the low octane value fuel to the in-cylinder fuel injector 11a.

Figure 2:
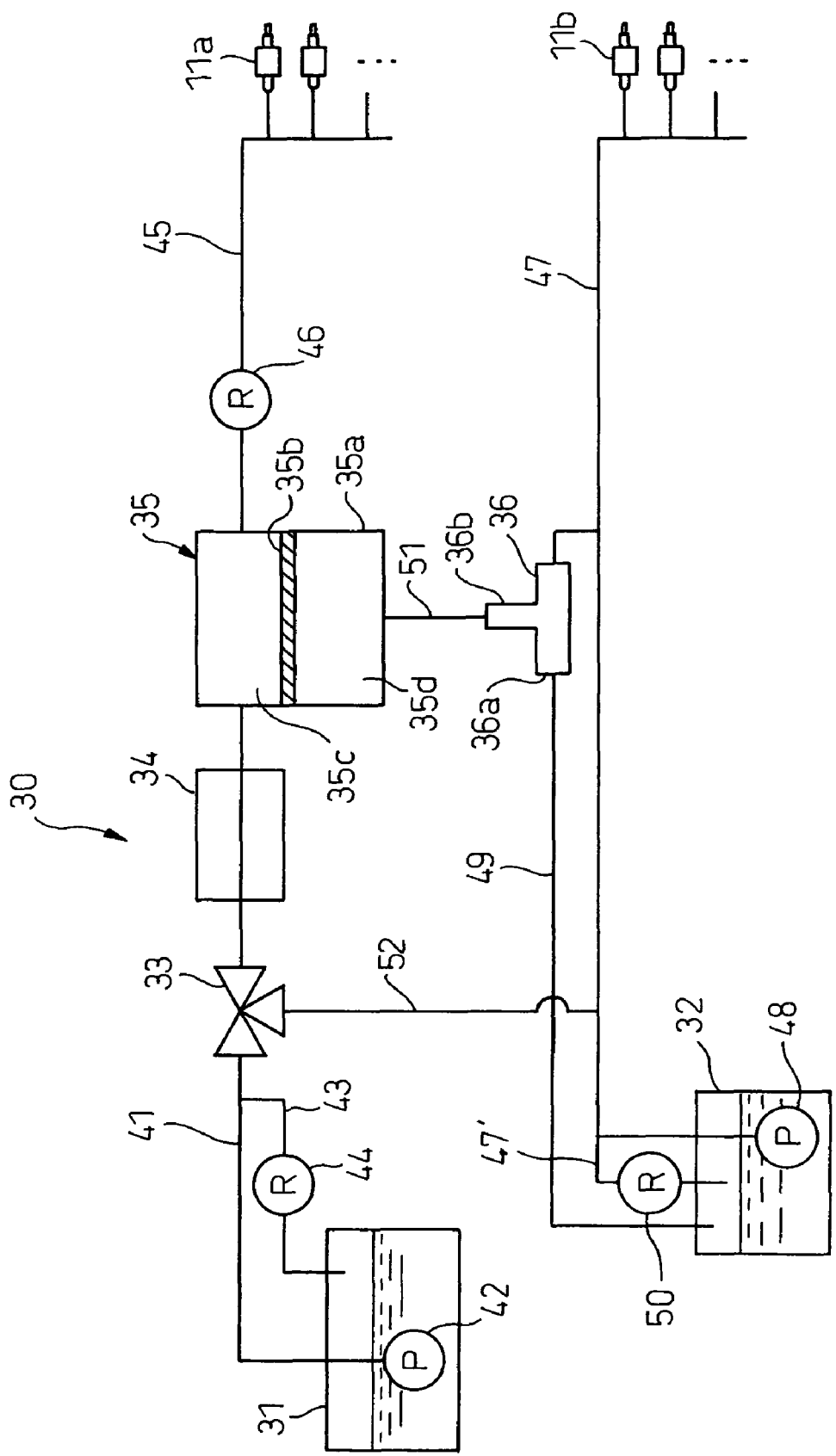
FIG. 2 is a view schematically showing the general configuration of the fuel separation apparatus of the first embodiment.

FIG. 2 is a view schematically showing the general configuration of the fuel separation apparatus 30. As shown in FIG. 2, the fuel separation apparatus 30 is provided with a stock fuel storage tank 31, a high octane value fuel storage tank 32, a three-way valve 33, a fuel heater 34, a separation unit 35, and a jet pump 36.

The separation unit 35 is configured dividing a housing 35a comprised of a heat resistant container by an aromatic separation film 35b into two chambers 35c and 35d. As the aromatic separation film 35b, one having the property of allowing the selective permeation of the aromatic component in the gasoline is used. That is, in the aromatic separation film 35b, if supplying the stock fuel to one side (for example, the chamber 35c side, that is, the low octane value fuel side) at a relatively high pressure and holding the other side (for example, the chamber 35d side, that is, the high octane value fuel side) at a relatively low pressure, the aromatic component in the stock fuel permeates through the separation film 35b, permeates to the surface of the low pressure side of the separation film 35b (chamber 35d side, that is, high octane value side), and covers the surface of the separation film 35 facing the low pressure side.

By removing the liquid permeated fuel covering the surface of this low pressure side of the separation film 35b, the aromatic component permeates continuously from the high pressure chamber 35c side to the low pressure chamber 35d side through the separation film 35b. In the present embodiment, by holding the pressure of the low pressure side (chamber 35d side) at a pressure lower than the vapor pressure of the permeated aromatic component, the permeate fuel containing a large amount of aromatic component covering the surface of the low pressure side of the separation film 35b is made to evaporate to continuously remove it from the surface and is recovered in the form of fuel vapor. The thus recovered fuel vapor contains a large amount of aromatic component. Therefore, high octane value fuel is produced at the low pressure side of the separation film 35b.

On the other hand, the fuel remaining at the high pressure side chamber 35c of the separation film unit 35 has a smaller content of high octane value components, since part of the aromatic component is removed. Therefore, inside the high pressure side chamber 35c of the separation film unit 35, a low octane value fuel with a lower content of aromatic component is produced.

Here, the separation efficiency of the separation film 35b greatly changes by the operation conditions of this separation film 35b. Therefore, to make the separation efficiency by the separation film 35b high, it is necessary to suitably control the operating conditions of the separation film 35b. One of the operating conditions affecting the separation efficiency of the separation film 35b is the temperature of the separation film 35b.

The ratio (selectivity) of the aromatic component in the stock fuel permeating through the separation film 35b in all of the components increases in accordance with a rise of the temperature of the stock fuel until reaching a certain temperature from the atmospheric temperature. This certain temperature is a temperature at which the temperature of the low pressure side (chamber 35d) of the separation film 35b reaches a certain lower limit temperature. This lower limit temperature is a function of the pressure of the low pressure side of the separation film 35b. For example, this lower limit temperature is about 353° K (80° C.) at the pressure of the low pressure side of 5 kPa.

On the other hand, if the temperature at the low pressure side continues to rise over the lower limit temperature, the selectivity falls if above a certain temperature. That is, there is an optimum temperature range where the temperature at the low pressure side should be maintained. This optimum temperature range is, for example, 348 K to 438 K (about 75° C. to 165° C.) or so in the range of a low pressure side pressure of 5 to 50 kPa.

Therefore, to maximize the separation efficiency by the separation film 35b, it is necessary to maintain the temperature of the stock fuel so that the low pressure side temperature of the separation film 35b becomes the optimum temperature range. For this reason, in the present embodiment, before supplying the stock fuel to the separation film unit 35, the fuel heater 34 is used to heat the stock fuel to maintain it at a temperature where the separation efficiency by the separation film 35b becomes the highest.

Note that in the embodiment of the present invention, as a fuel heater 34, an exhaust heat recovery device recovering the heat from the exhaust gas and transmitting this recovered heat to the heated object (in the present embodiment, the stock fuel) is utilized. However, the fuel heater 34 may also be configured as a heat exchanger exchanging heat between the engine body or cooling water and stock fuel, an electric heater directly heating the stock fuel (that is, a device utilizing the heat generated by electric power to heat the stock fuel), etc.

Further, the above-mentioned configuration of the fuel separation apparatus 30 is just one example. If the fuel is separated using a separation film, any configuration of fuel separation apparatus 30 may be used. Therefore, for example, to separate the stock fuel into high octane value fuel and low octane value fuel, it is also possible to use a separator different from the separation unit 35.

In this regard, as explained above, to separate fuel by a separation film 35b, it is necessary to hold the pressure in the chamber 35d of the separation unit 35 at a relatively low pressure. Therefore, in the present embodiment, the jet pump (ejector) 36 is used to hold the pressure inside the chamber 35d at a relatively low pressure. The jet pump 36 is provided with a body part 36a and a branch part 36b. If fluid is run through the body part 36a, negative pressure is generated at the branch part 36b. Therefore, by connecting the branch part 36b of the jet pump 36 to the chamber 35d of the separation unit 35, it becomes possible to hold the pressure inside the chamber 35d of the separation unit 35 at a relatively low pressure.

These components of the fuel separation apparatus 30 are connected to each other by a plurality of passages. The stock fuel storage tank 31 is connected by a fuel supply passage 41 to the high pressure side chamber 35c of the separation unit 35. The fuel supply passage 41 is provided with the fuel heater 34. This fuel heater 34 heats the fuel supplied to the separation unit 35. The fuel supply passage 41 is provided with a fuel pump 42. This fuel pump 42 is used to supply the stock fuel in the stock fuel storage tank 31 under pressure. Further, from the fuel supply passage 41, a return passage 43 returning the stock fuel to the stock fuel storage tank 31 extends. This return passage 43 is provided with a regulator 44 for maintaining constant the pressure of the fuel in the fuel supply passage 41.

The high pressure side chamber 35c of the separation unit 35 is connected by an in-cylinder injector passage 45 to the in-cylinder fuel injector 11a. The in-cylinder injector passage 45 is provided with a regulator 46 for maintaining constant the pressure of the fuel in the high pressure side chamber 35c. Note that, in the present embodiment, the high pressure side chamber 35c is directly connected by the in-cylinder injector passage 45 to the in-cylinder fuel injector 11a, but it is also possible to provide a low octane value fuel storage tank between the separation unit 35 and the in-cylinder fuel injector 11a and supply fuel from this low octane value fuel storage tank to the in-cylinder fuel injector 11a.

On the other hand, the high octane value fuel storage tank 32 is connected by a port injector passage 47 to the port fuel injector 11b. The port injector passage 47 is provided with a fuel pump 48. Due to this fuel pump 48, the fuel in the high octane value fuel storage tank 32 is supplied under pressure. From the port injector passage 47, a return passage 49 returning the high octane value fuel to the high octane value fuel storage tank 32 extends. Further, from the port injector passage 47 upstream of the connecting portion of the return passage 49, a return passage 47' returning the high octane value fuel to the high octane value fuel storage tank 32 is branched off. Return passage 47' is provided with a regulator 50 for maintaining constant pressure of the fuel in the body 36a of the jet pump 36 and the port injector passage 47. The branch part 36b of the jet pump 36 is connected by a pump passage 51 to the low pressure side chamber 35d of the separation unit 35. Due to this, when high octane value fuel flows through the return passage 49, negative pressure is generated at the branch part 36b of the jet pump 36 and as a result the pressure in the chamber 35d of the separation unit 35 is reduced.

The fuel supply passage 41 is provided with a three-way valve 33 at the downstream side of the fuel pump 42 and the branch part of return passage 43 and the upstream side of the fuel heater 34. This three-way valve 33 has a three-way valve passage 52 connected to it. This three-way valve passage 52 is connected to a port injector passage 47. The three-way valve 33 can be switched between the stock fuel supply position and the high octane value fuel supply position. When the three-way valve 33 is at the stock fuel supply position, the stock fuel in the stock fuel storage tank 31 flows through the three-way valve 33 and is supplied to the fuel heater 34 and the chamber 35c of the separation unit 35. On the other hand, when the three-way valve 33 is at the high octane value fuel supply position, the high octane value fuel in the high octane value fuel storage tank 32 flows through the three-way valve 33 and is supplied to the fuel heater 34 and the chamber 35c of the separation unit 35.

Note that in the above-mentioned configuration of a fuel separation apparatus 30, a jet pump 36 is used to lower the pressure of the low pressure side chamber 35d of the separation unit 35. However, if the pressure inside the low pressure side chamber 35d of the separation unit 35 can be lowered and the fuel permeating to the low pressure side chamber 35d can be made to flow into the high octane value fuel storage tank

32, it is also possible to use devices other than the jet pump 36, for example, an electric driven pump etc.

Figure 3:
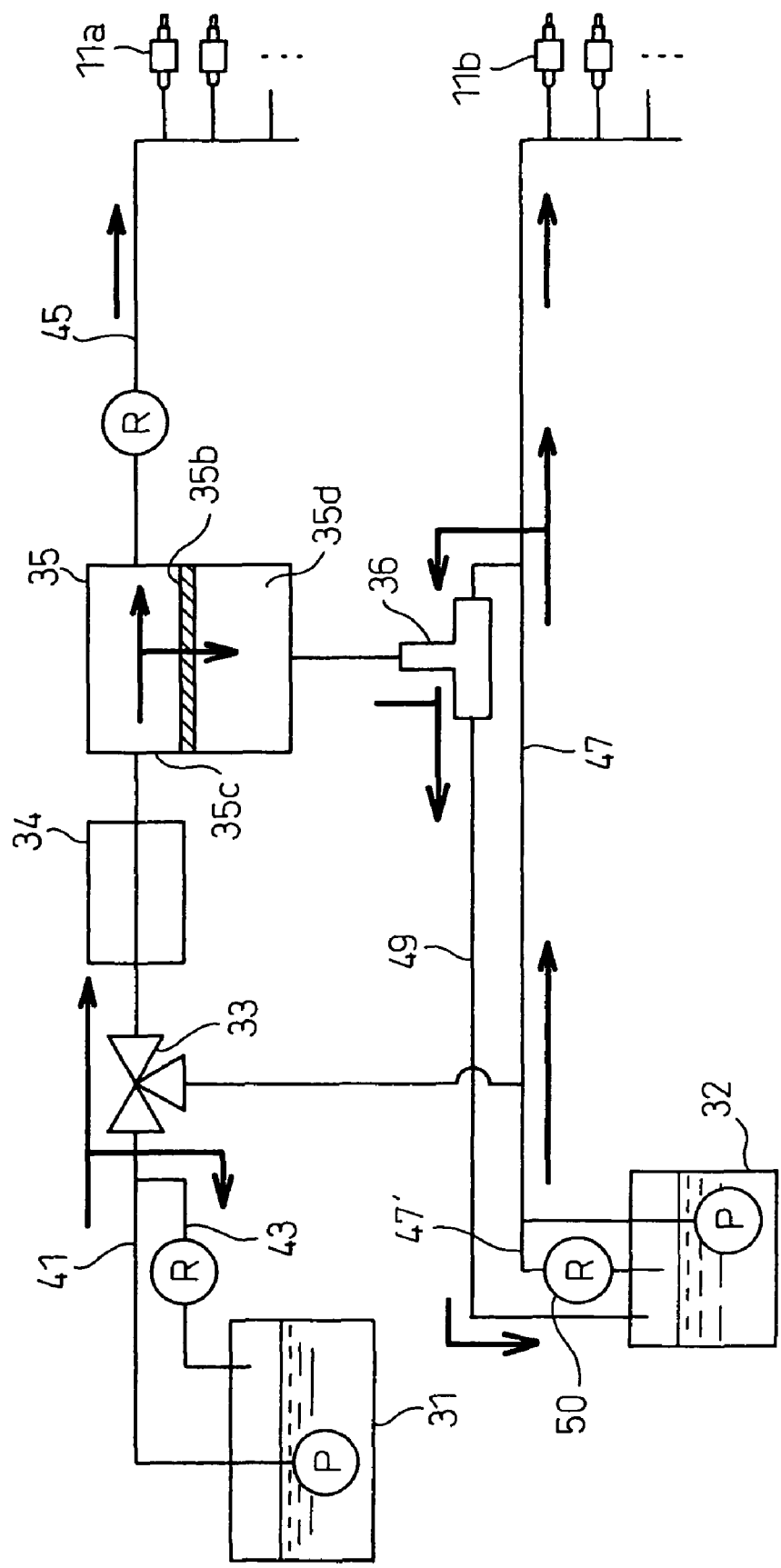
FIG. 3 is a view showing the flow of fuel at the time of normal engine operation in the fuel separation apparatus of the first embodiment.

Next, the flow of fuel in the thus configured fuel separation apparatus 30 will be explained. FIG. 3 is a view showing the flow of fuel at the time of normal engine operation, i.e., at the time of operation other than at the time of engine cold start. The arrows in the figure show the flow of fuel. At the time of normal operation, the three-way valve 33 is set at the stock fuel supply position.

As shown by the arrows in FIG. 3, the stock fuel stored in the stock fuel storage tank 31 is pressurized by the fuel pump 42 and flows into the fuel supply passage 41. Part of the fuel flowing into the fuel supply passage 41 is returned through the return passage 43 and regulator 44 into the stock fuel storage tank 31. Due to this, the pressure of the stock fuel inside the fuel supply passage 41 is held substantially constant. Since the three-way valve 33 is at the stock fuel supply position, the stock fuel in the fuel supply passage 41 flows through the three-way valve 33 into the fuel heater 34. The stock fuel flowing into the fuel heater 34 is heated to a predetermined temperature, then flows into the high pressure side chamber 35c of the separation unit 35. The stock fuel flowing into the high pressure side chamber 35c is raised in temperature at the fuel heater 34 until the separation efficiency by the separation film 35b becomes the highest. Further, the outlet of the high pressure side chamber 35c is provided with a regulator 46. Due to this regulator 46, the pressure of the fuel in the high pressure side chamber 35c is held at a relatively high pressure. Therefore, the fuel in the high pressure side chamber 35c of the separation unit 35 becomes a high temperature and a high pressure.

If stock fuel is supplied to the separation unit 35 in this way, the separation unit 35 separates the stock fuel into high octane value fuel and low octane value fuel. Low octane value fuel is generated at the high pressure side chamber 35c of the separation unit 35. The thus produced low octane value fuel is supplied through the in-cylinder injector passage 45 to the in-cylinder fuel injector 11a, and then is directly injected from the in-cylinder fuel injector 11a to the inside of the combustion chamber 5.

On the other hand, as explained above, if the separation unit 35 is supplied with stock fuel, high octane value fuel is produced at the low pressure side chamber 35d of the separation unit 35. The high octane value fuel produced at the low pressure side chamber 35d is sucked through the pump passage 51 by the jet pump 36, flows through the return passage 49 to the high octane value fuel storage tank 32 and is stored therein.

The high octane value fuel stored in the high octane value fuel storage tank 32 is pressurized by the fuel pump 48 and flows into the port injector passage 47. Part of the fuel flowing into the port injector passage 47 is returned through the return passage 49 to the inside of the high octane value fuel storage tank 32. The pressure of the high octane fuel in the port injector passage 47 is held substantially constant by regulator 50. Further, the return passage 49 is provided with a jet pump 36. The jet pump 36 generates negative pressure by the flow of high octane value fuel returned through the return passage 49 to the high octane value fuel storage tank 32. The high octane value fuel not returned by the return passage 49 to the high octane value fuel storage tank 32 is supplied to the port fuel injector 11b and is injected from the port fuel injector 11b to the inside of the intake port 8.

In the meantime, if the three-way valve 33 is not provided or if setting the switching position of the three-way valve 33 to the stock fuel supply position at the time of engine cold start, the temperature of the stock fuel supplied to the separation unit 35 sometimes ends up becoming low. That is, at the time of engine cold start, the components of the fuel separation apparatus 30 are low in temperature. Therefore, even if using the fuel heater 34 to heat the stock fuel, the heat of the stock fuel ends up being lowered by the components (for example, separation unit 35, fuel supply passage 41, etc.) of the fuel separation apparatus 30, so when flowing into the separation unit 35, the stock fuel ends up becoming low in temperature.

If the stock fuel flowing into the separation unit 35 is low in temperature in this way, the temperature of the separation film 35b will not become within the above optimum temperature range and the separation efficiency by the separation film 35b will end up falling. In particular, when the temperature of the separation film 35b is lower than the lower limit temperature (high octane value fuel separation temperature), compared to the high boiling point components contained in the stock fuel flowing into the high pressure side chamber 35c of the separation unit 35, the low boiling point components permeate through the separation film 35b easier. For this reason, the octane value of the fuel permeating through the separation film 35b is not that high. If fuel not high in octane value permeates through the separation film 35b in this way, a drop in the octane value of the fuel stored in the high octane value fuel storage tank 32 ends up being invited.

Further, at the time of engine cold start etc., the temperature of the separation film 35b is raised by the fuel flowing into the separation unit 35. That is, at the time of engine cold start as well, the fuel flowing into the separation unit 35 is first heated by the fuel heater 34, then the heated fuel flows into the high pressure side chamber 35c of the separation unit 35. In this way, the separation film 35b is raised in temperature by the high temperature fuel flowing into the high pressure side chamber 35c.

In this regard, the liquid stock fuel vaporizes relatively easily and vaporizes when heated by the fuel heater 34. Here, when the liquid stock fuel vaporizes, the heat of vaporization is taken by the stock fuel. Therefore, the amount of heat given to the stock fuel by the fuel heater 34 ends up being consumed for vaporization of the fuel and as a result the temperature of the fuel supplied to the separation unit 35 ends up becoming harder to raise. If the temperature of the fuel supplied to the separation unit 35 becomes difficult to rise in this way, along with this, the temperature of the separation film 35b also becomes difficult to rise and the separation film 35b can no longer be quickly raised in temperature.

In this way, if a three-way valve 33 is not provided or if the switching position of the three-way valve 33 is set to the stock fuel supply position, at the time of engine cold start, the high octane value fuel stored in the high octane value fuel storage tank ends up falling in octane value, the vaporization of the heated fuel makes the fuel temperature harder to rise, and therefore the separation film cannot be quickly raised in temperature.

Therefore, in the present embodiment, at the time of engine cold start, in particular when the temperature of the separation film 35b is lower than the high octane value fuel separation temperature, the three-way valve 33 is switched from the stock fuel supply position to the high octane value fuel supply position. Therefore, in the present embodiment, at the time of engine cold start, the separation unit 35 is supplied not with the stock fuel stored in the stock fuel storage tank 31, but the high octane value fuel stored in the high octane value fuel storage tank 32.

Figure 4:
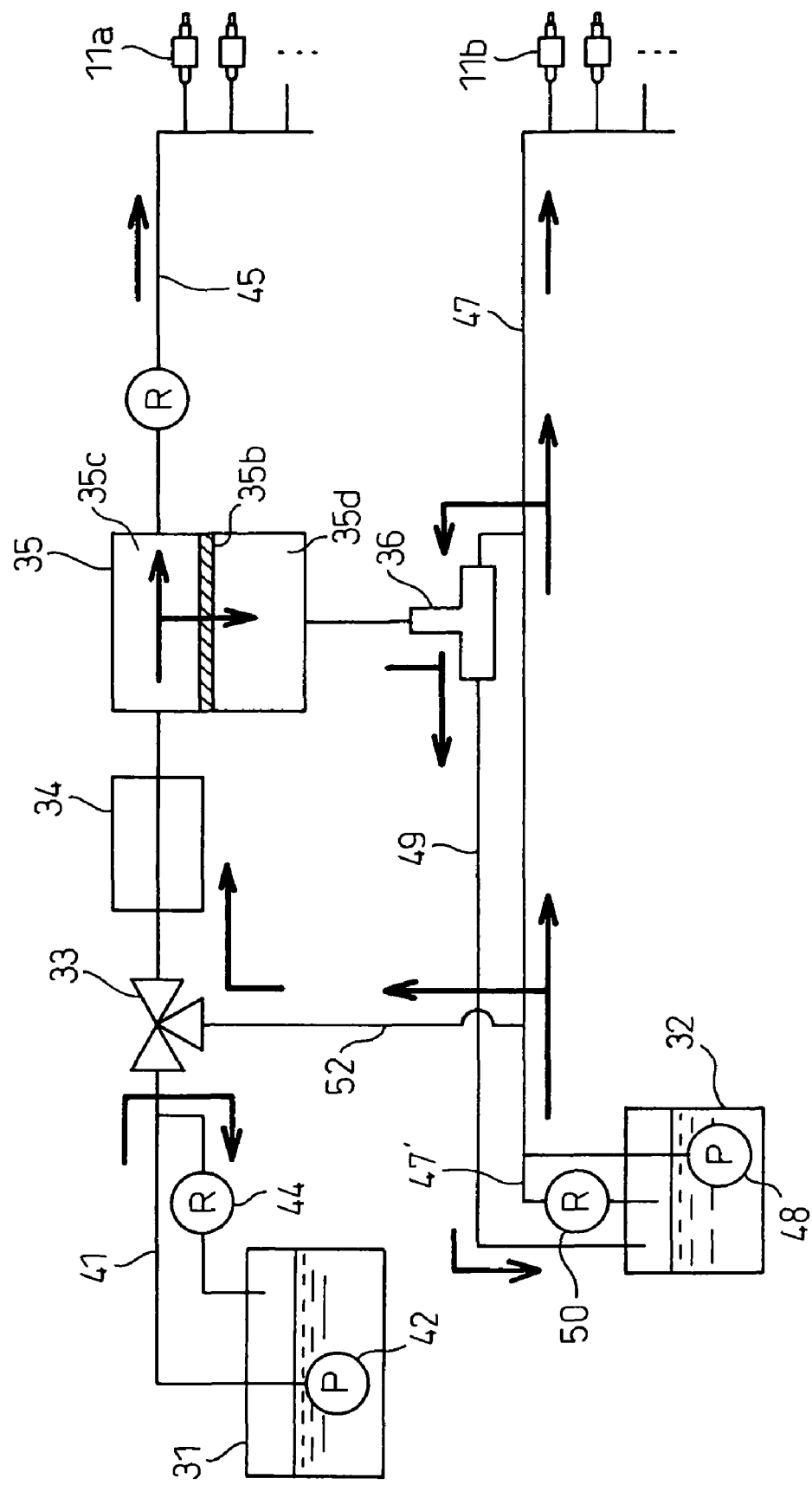
FIG. 4 is a view showing the flow of fuel when switching a three-way valve to a high octane value fuel supply position.

FIG. 4 is a view showing the flow of fuel in the case of switching the three-way valve 33 to the high octane value fuel supply position. The arrows in the figure show the flow of fuel.

As shown by the arrows in FIG. 4, the stock fuel stored in the stock fuel storage tank 31 is pressurized by the fuel pump 42 and flows into the fuel supply passage 41. However, since the three-way valve 33 is at the high octane value fuel supply position, the fuel flowing into the fuel supply passage 41 is completely returned through the return passage 43 into the stock fuel storage tank 31. Note that, in the present embodiment, the fuel pump 42 is driven even when the three-way valve 33 is switched to the high octane value fuel supply position, but the fuel pump 42 may also be stopped when the switching position of the three-way valve 33 is the high octane value fuel supply position.

On the other hand, the high octane value fuel stored in the high octane value fuel storage tank 32 is pressurized by the fuel pump 48 and flows into the port injector passage 47. Since the three-way valve 33 is in the high octane value fuel supply position, part of the high octane value fuel flowing into the port injector passage 47 flows through the three-way valve passage 52 and the three-way valve 33 to the fuel heater 34. The high octane value fuel flowing into the fuel heater 34 is heated, then flows to the high pressure side chamber 35c of the separation unit 35. Since the fuel flowing into the high pressure side chamber 35c is heated by the fuel heater 34, it becomes a relatively high temperature. Due to this, the temperature of the separation film 35b is raised.

In this way, when the high octane value fuel is supplied to the separation unit 35, fuel with an octane value lower than the high octane value fuel supplied to the separation unit 35 is produced at the high pressure side chamber 35c of the separation unit 35. This fuel is supplied through the in-cylinder injector passage 45 to the in-cylinder fuel injector 11a and is directly injected from the in-cylinder fuel injector 11a into the combustion chamber 5.

On the other hand, at the low pressure side chamber 35d of the separation unit 35, fuel with an octane value higher than the high octane value fuel supplied to the separation unit 35 is produced. This fuel is sucked through the pump passage 51 by the jet pump 36, flows through the return passage 49 into the high octane value fuel storage tank 32 and is stored. Since fuel with an octane value higher than the high octane value fuel flowing out from the high octane value fuel storage tank 32 flows into the high octane value fuel storage tank 32, the octane value of the fuel as a whole stored in the high octane value fuel storage tank 32 is raised. Therefore, at the time of engine cold start, the high octane value fuel stored in the high octane value fuel storage tank 32 is prevented from falling in octane value.

Further, another part of the high octane value fuel flowing from the high octane value fuel storage tank 32 into the port injector passage 47 is returned through the return passage 49 into the high octane value fuel storage tank 32. At that time, a negative pressure is generated at the jet pump 36. The rest of the high octane value fuel flowing from the high octane value fuel storage tank 32 into the port injector passage 47 is supplied to the port fuel injector 11b and is injected from the port fuel injector 11b into the intake port 8.

As explained above, at the time of engine cold start, the three-way valve 33 is switched from the stock fuel supply position to the high octane value fuel supply position whereby the high octane fuel is heated by the fuel heater 34 and the heated high octane value fuel is supplied to the separation unit 35.

Here, the high octane value fuel becomes harder to vaporize compared with the stock fuel. Therefore, even if heated by the fuel heater 34, the heat taken by the heat of vaporization is reduced and therefore the temperature of the high octane value fuel is raised by exactly the amount of heat applied from the fuel heater 34 to the high octane value fuel. That is, the temperature of the fuel supplied to the separation unit 35 rises easier. For this reason, the temperature of the separation film 35b also rises easier and as a result the separation film 35b can be quickly raised in temperature.

Therefore, in the present embodiment, at the time of engine cold start, the three-way valve 33 is switched from the stock fuel supply position to the high octane value fuel supply position, whereby the high octane value fuel is prevented from falling in octane value and the separation film 35b can be quickly raised in temperature.

Note that, in the above embodiment, the three-way valve 33 is switched according to whether the temperature of the separation film 35b is the high octane value fuel separation temperature or more. The temperature of this separation film 35b is detected by a temperature sensor (not shown) attached to the separation film 35b. However, the temperature of the separation film 35b need not be detected by a temperature sensor. For example, it is also possible to estimate the temperature of the separation film 35b based on the output of the temperature sensor detecting the temperature of the fuel in the high pressure side chamber 35c of the separation unit 35.

Further, in the above embodiment, the three-way valve 33 is switched according to whether the temperature of the separation film 35b is the high octane value fuel separation temperature or more, but it is also possible not to switch the three-way valve 33 based on the temperature of the separation film 35b. That is, if the three-way valve 33 is switched based on whether the separation film 35b suitably separates the stock fuel, it may be switched by any standard. For example, if the aromatic component is large, the fuel becomes a high density, so the three-way valve 33 may be switched according to whether the density of the fuel permeating through the separation film 35b is a predetermined density or more.

Figure 5:
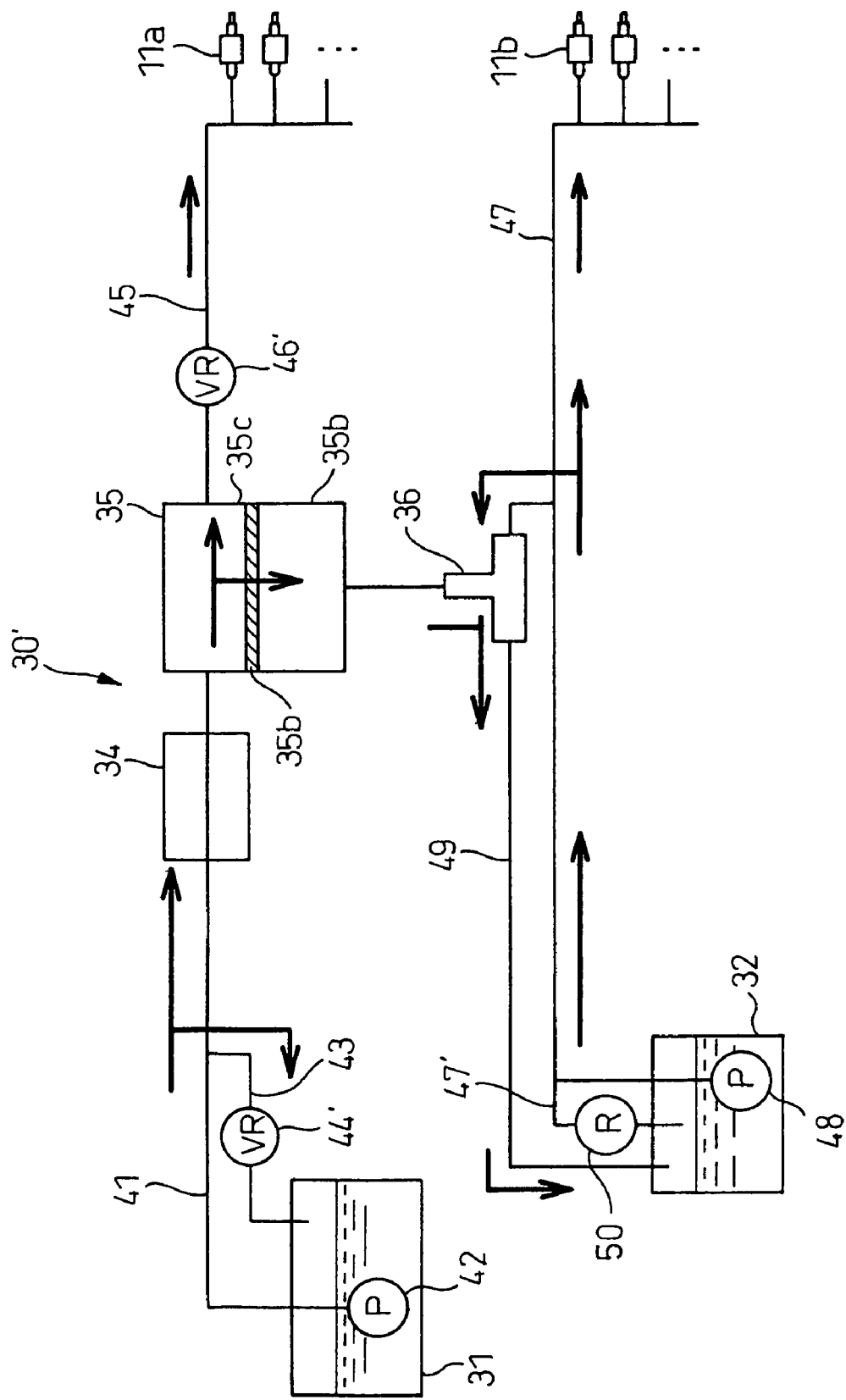
FIG. 5 is a view schematically showing the general configuration of the fuel separation apparatus of the second embodiment.

Next, referring to FIG. 5, a second embodiment of the present invention will be explained. The configuration of the fuel separation apparatus 30' of the second embodiment is basically similar to the fuel separation apparatus 30 of the first embodiment. However, in the fuel separation apparatus 30' of the second embodiment, the three-way valve 33 is not provided. A variable regulator 46' able to change the working pressure is provided as a regulator.

In more detail, in the fuel separation apparatus 30' of present embodiment, unlike the fuel separation apparatus 30 of the first embodiment, no three-way valve 33 and three-way valve passage 52 are provided. Therefore, the high octane value fuel stored in the high octane value fuel storage tank 32 cannot be supplied to the fuel heater 34 and separation unit 35.

Further, in the present embodiment, the return passage 43 branched out from the fuel supply passage 41 is provided with a variable regulator 44' able to be changed in working pressure, instead of a fixed regulator 44 unable to change the working pressure used in the first embodiment. Further, the in-cylinder injector passage 45 is provided with a variable regulator 46' instead of the fixed regulator 46. Note that, in the present embodiment, the regulator 50 provided at the return passage 47' branched off from the port injector passage 47 is made a fixed regulator, but this regulator 50 may also be a variable regulator.

In the thus configured fuel separation apparatus 30', at the time of normal engine operation and at the time of engine cold start, fuel flows in the same way as at the normal engine operation of the fuel separation apparatus 30 of the first embodiment. This flow of fuel is shown by the arrows in the figure. Further, the working pressures of the variable regulators 44', 46' are substantially the same as the working pressures of the fixed regulators 44, 46 of the first embodiment, at the time of normal engine operation. Therefore, the pressure of the fuel flowing through the fuel supply passage 41 in the present embodiment and the pressure of the fuel in the fuel heater 34 and separation unit 35 are substantially the same as the pressure of the fuel in the first embodiment.

On the other hand, at the time of engine cold start, the working pressures of the variable regulators 44', 46' are higher pressures than the working pressure at the time of normal engine operation. By the working pressure of the variable regulator 44' being raised, the pressure of the stock fuel flowing through the fuel supply passage 41 and fuel heater 34 is raised. Further, by the working pressure of the variable regulator 46' being raised, the pressure of the fuel in the high pressure side chamber 35*c* of the separation unit 35 is raised. In this way, in the present embodiment, at the time of engine cold start, the pressure of the fuel from the fuel heater 34 to the high pressure side chamber 35*c* of the separation unit 35 is raised.

In the meantime, as explained above, since the liquid stock fuel vaporizes relatively easily, if supplying stock fuel to the separation unit 35 at the time of engine cold start, the stock fuel ends up vaporizing if heated by the fuel heater 34 and as a result the separation film 35*b* can no longer be quickly raised in temperature.

Here, in the present embodiment, at the time of engine cold start, the pressure of the fuel from the fuel heater 34 to the high pressure side chamber 35*c* of the separation unit 35 is raised from the fuel heater 34. For this reason, the stock fuel no longer vaporizes much even if heated by the fuel heater 34. If the stock fuel no longer vaporizes, the amount of heat taken by the vaporization of the stock fuel is reduced and therefore the amount of heat added to the stock fuel by the fuel heater 34 is used for raising the temperature of the stock fuel without being consumed for fuel vaporization. In this way, in the present embodiment, the stock fuel is quickly raised in temperature by the fuel heater 34. Along with this, the separation film 35*b* is also quickly raised in temperature.

Therefore, in the present embodiment, at the time of engine cold start, the pressure of the fuel from the fuel heater 34 to the high pressure side chamber 35*c* of the separation unit 35 is raised, whereby vaporization of the stock fuel is suppressed and thereby the separation film 35*b* is quickly raised in temperature.

Next, referring to FIG. 6 and FIG. 7, a third embodiment of the present invention will be explained. The configuration of the fuel separation apparatus 30" of third embodiment is similar to the configuration of the fuel separation apparatuses of the first embodiment and the second embodiment. That is, in a fuel separation apparatus 30" of the third embodiment, the three-way valve 33 is provided and a variable regulator able to change the working pressure is provided as a regulator.

More particular, in the fuel separation apparatus 30" of the present embodiment, in the same way as the fuel separation apparatus 30 of the first embodiment, the three-way valve 33 and three-way valve passage 52 are provided. Further, in fuel separation apparatus 30" of the present embodiment, the regulator provided at the return passage 47' branched from the port injector passage 47 and the regulator provided at the in-cylinder injector passage 45 are made the variable regulators 50', 46'. Note that, in the present embodiment, the regulator 44 provided at the return passage 43 branched from the fuel supply passage 41 is a fixed regulator, but this regulator 44 may also be a variable regulator.

Figure 6:
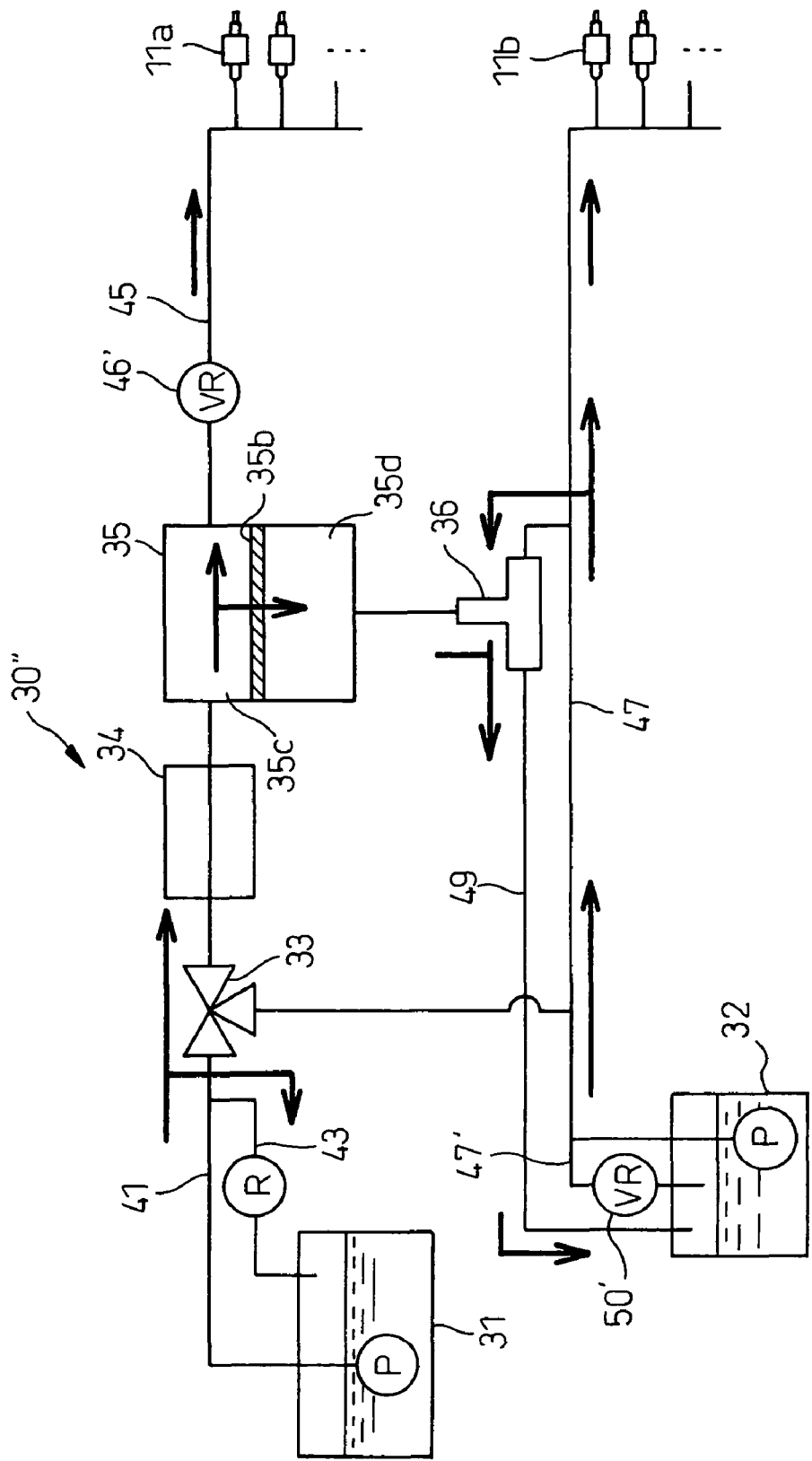
FIG. 6 is a view showing the flow of fuel at the time of normal engine operation in a fuel separation apparatus of the third embodiment.
Figure 7:
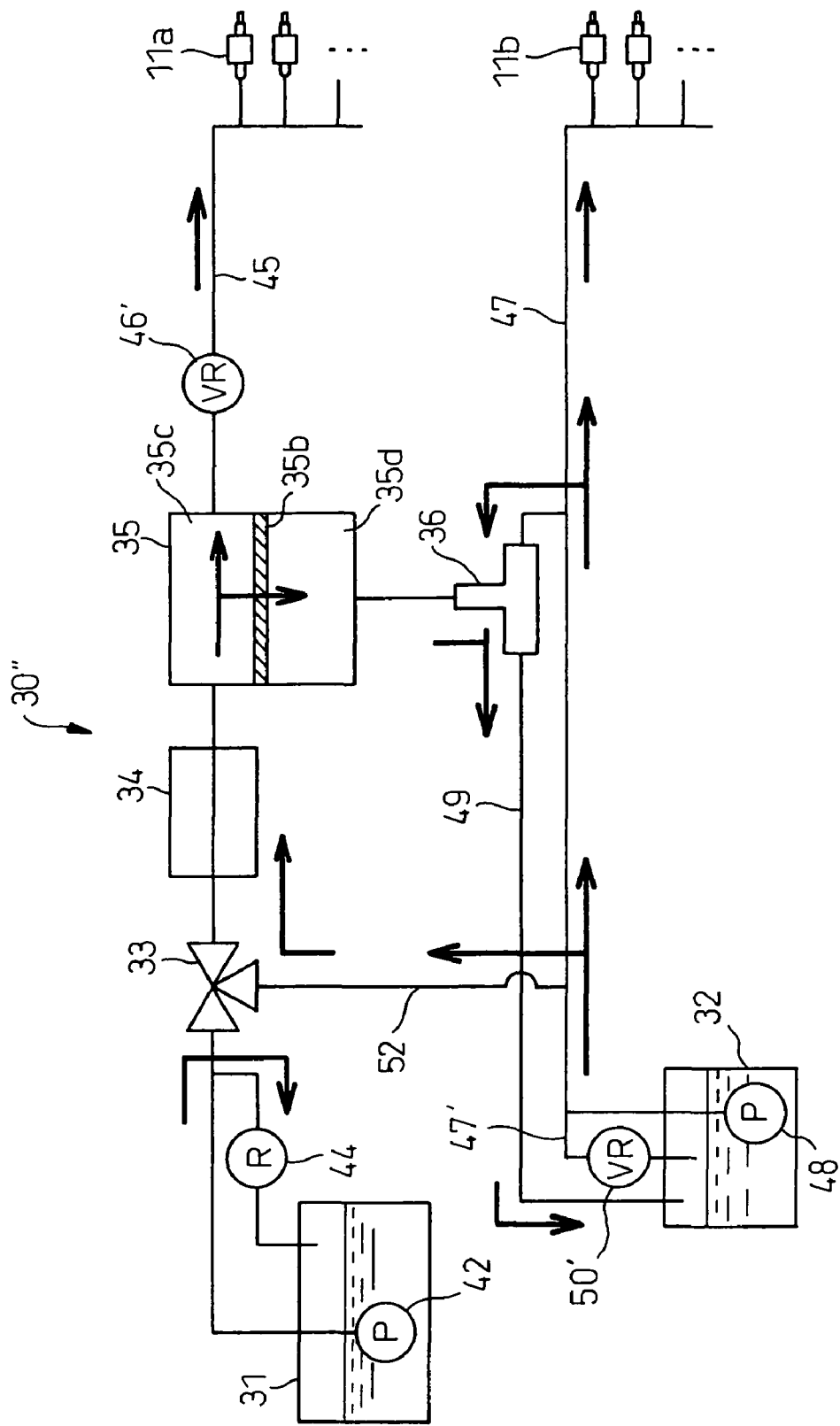
FIG. 7 is a view showing the flow of fuel at the time of engine cold start in a fuel separation apparatus of the third embodiment.

In the thus configured fuel separation apparatus 30", at the time of normal engine operation, as shown in FIG. 6, fuel flows in the same way as the time of normal engine operation of the fuel separation apparatus 30 of the first embodiment. Further, the time of engine cold start, as shown by the arrows in FIG. 7, fuel flows in the same way as at the time of engine cold start of the fuel separation apparatus 30 of the first embodiment.

Further, the working pressures of the variable regulators 46', 50' are substantially the same as the working pressures of the fixed regulators 46, 50 of the first embodiment, at the time of normal engine operation. Therefore, in the present embodiment as well, at the time of normal engine operation, the pressure of the fuel flowing through the fuel supply passage 41 and the pressure of the fuel in the fuel heater 34 and separation unit 35 are substantially the same as the pressure of the fuel in the first embodiment.

On the other hand, at the time of engine cold start, the three-way valve 33 is switched to the high octane value fuel supply position. For this reason, in the same way as when setting the three-way valve 33 at the high octane value fuel supply position, in the fuel separation apparatus 30 of the first embodiment, high octane value fuel flows into the fuel heater 34 and separation unit 35. Due to this, as explained above, it becomes possible to prevent the high octane value fuel from falling in octane value and to quickly raise the separation film 35*b* in temperature.

Further, the working pressures of the variable regulators 46', 50' at the time of engine cold start are higher pressures than the working pressures at the time of normal engine operation. By the working pressures of the variable regulators 46', 50' being higher, the pressure of the stock fuel flowing through the port injector passage 47, three-way valve passage 52, and fuel heater 34 is raised. Further, by the working pressure of the variable regulator 46' being raised, the pressure of the fuel in the high pressure side chamber of the separation unit 35 is raised. In this way, in the present embodiment, at the time of engine cold start, the pressure of the fuel from the fuel heater 34 to the high pressure side chamber 35*c* of the separation unit 35 is raised. Due to this, as explained above, evaporation of the fuel is suppressed and the separation film 35*b* can be quickly raised in temperature.

Figure 8:
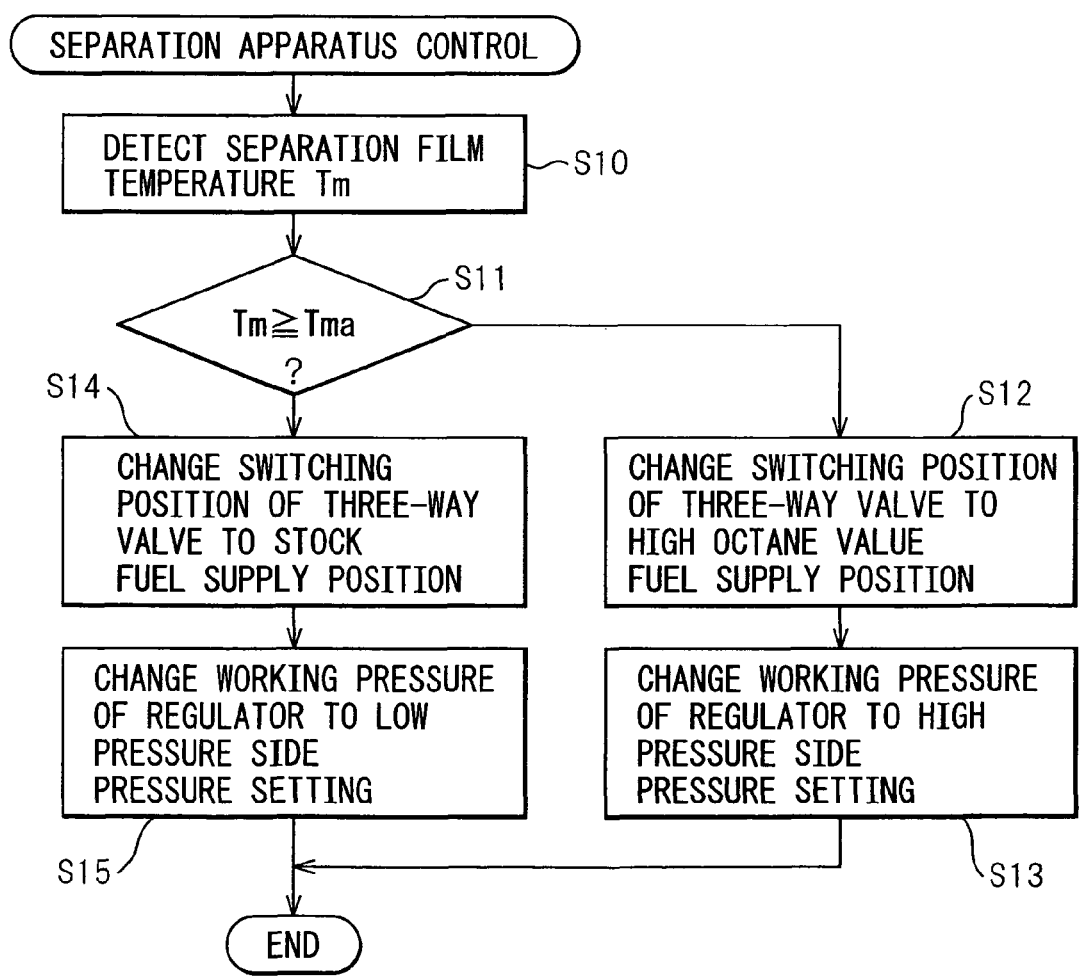
FIG. 8 is a flow chart showing a control routine of the fuel separation apparatus of the third embodiment.

FIG. 8 is a flow chart showing the control routine for controlling the fuel separation apparatus of the third embodiment. The illustrated control routine is performed by interruption every certain time interval.

As shown in FIG. 8, first, at step S10, the temperature Tm of the separation film 35*b* is detected. The temperature of the separation film 35*b* is detected for example by a temperature sensor directly detecting the temperature of the separation film 35*b* as explained above. Next, at step S11, it is detected if the temperature Tm of the separation film 35*b* detected at step S10 is the above-mentioned high octane value fuel separation temperature Tma or more.

At the time of engine cold start, the temperature Tm of the separation film 35*b* is low, so at step S11, it is judged that the temperature Tm of the separation film 35*b* is lower than the high octane value fuel separation temperature Tma and the routine proceeds to step S12. At step S12, the switching position of the three-way valve 33 is made the high octane value fuel supply position, next, at step S13, the working pressures of the variable regulators 46', 50' are made high pressures (high pressure side pressure settings).

After this, if the temperature of the separation film 35*b* is raised by the fuel flowing into the separation unit 35, at step S11, the temperature Tm of the separation film 35b becomes the high octane value fuel separation temperature or more. At the next control routine, the routine proceeds from step S11 to step S14. At step S14, the switching position of the three-way valve 33 is made the stock fuel supply position. Next, at step S15, the working pressures of the variable regulators 46', 50' are made low pressures (low pressure side pressure settings).

While the invention has been described by reference to specific embodiments chosen for purposes of illustration, it should be apparent that numerous modifications could be made thereto by those skilled in the art without departing from the basic concept and scope of the invention.

The invention claimed is:

1. A vehicle mounted fuel separation apparatus comprising:
   a stock fuel storage tank storing stock fuel;
   a separator provided with a separation film separating a stock fuel into a high octane value fuel with an octane value higher than the stock fuel and a low octane value fuel with an octane value lower than the stock fuel;
   a high octane value fuel storage tank storing the high octane value fuel separated by said separator; and
   a controller configured to supply fuel stored in said high octane value fuel storage tank to said separator, through a fuel supply line, when the temperature of said separation film is lower than the high octane value fuel separation temperature.

2. A vehicle mounted fuel separation apparatus as set forth in claim 1, wherein when the temperature of said separation film becomes the high octane value fuel separation temperature or more, the stock fuel stored in the stock fuel storage tank is supplied to said separator.

3. A vehicle mounted fuel separation apparatus as set forth in claim 2, further comprising a three-way valve connecting with said stock fuel storage tank, separator, and high octane value fuel storage tank, wherein said three-way valve connects the high octane value fuel storage tank to the separator when the temperature of said separation film is lower than the high octane value fuel separation temperature and connects the stock fuel storage tank to the separator when the temperature of said separation film is the high octane value fuel separation temperature or more.

4. A vehicle mounted fuel separation apparatus as set forth in claim 1, further comprising a fuel heating device heating the stock fuel and high octane value fuel, wherein the stock fuel and high octane value fuel flowing into said separator are heated by said fuel heating device before flowing into said separator.

5. A vehicle mounted fuel separation apparatus as set forth in claim 1, further comprising a jet pump generating negative pressure by the flow of fuel,
   wherein said separator is divided into two chambers by the separation film, and
   one chamber among these chambers is reduced in pressure by the negative pressure generated by the jet pump.

6. A vehicle mounted fuel separation apparatus as set forth in claim 5, further comprising the apparatus is provided with a return passage extending from a passage for supplying fuel from said high octane value fuel storage tank to a fuel injector and returning part of the fuel heading from the high octane value fuel storage tank to the fuel injector, to the high octane value fuel storage tank,
   wherein said jet pump is attached to said return passage and generates negative pressure by the flow of high octane value fuel through said return passage.

7. A vehicle mounted fuel separation apparatus as set forth in claim 1, wherein the pressure of the high octane value fuel supplied to the separator when the temperature of said separation film is lower than the high octane value fuel separation temperature is made higher than the pressure of the stock fuel supplied to the separator when the temperature of said separation film is the high octane value fuel separation temperature or more.

8. A vehicle mounted fuel separation apparatus comprising:
   a stock fuel storage tank storing stock fuel;
   a separator provided with a separation film separating the stock fuel into a high octane value fuel with an octane value higher than the stock fuel and a low octane value fuel with an octane value lower than the stock fuel; and
   a high octane value fuel storage tank storing the high octane value fuel separated by said separator, wherein
      a controller configured to supply fuel stored in said high octane value fuel storage tank to said separator, through a fuel supply line, when the temperature of said separation film is lower than the high octane value fuel separation temperature, and
      a controller is configured to make a pressure of the fuel supplied to the separator, when the temperature of said separation film is lower than the high octane value fuel separation temperature, higher than the pressure of the fuel supplied to the separator when the temperature of said separation film is the high octane value fuel separation temperature or more.

9. A vehicle mounted fuel separation apparatus as set forth in claim 7, further comprising a regulator controlling the pressure of the fuel flowing into said separator, wherein the working pressure of said regulator is changed to change the pressure of the fuel supplied to the separator.

* * * * *